July 23, 1946.  E. W. DAVIS  2,404,621
GREASE STRAINER
Filed March 31, 1943
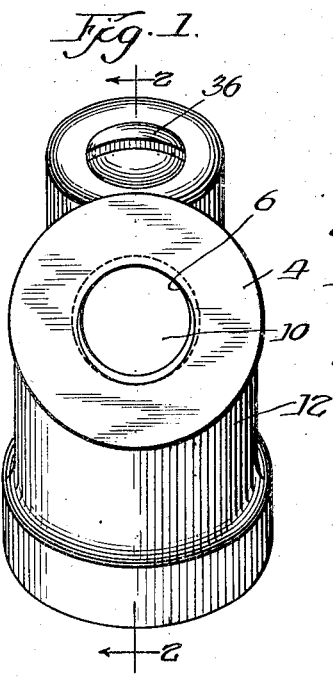
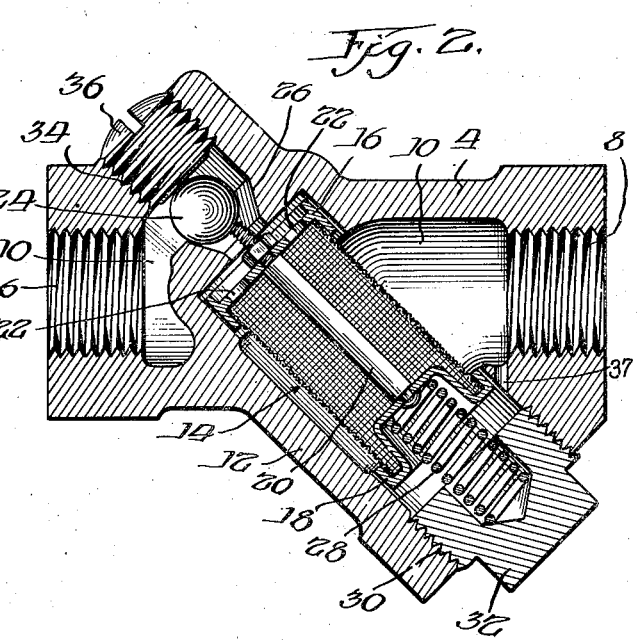
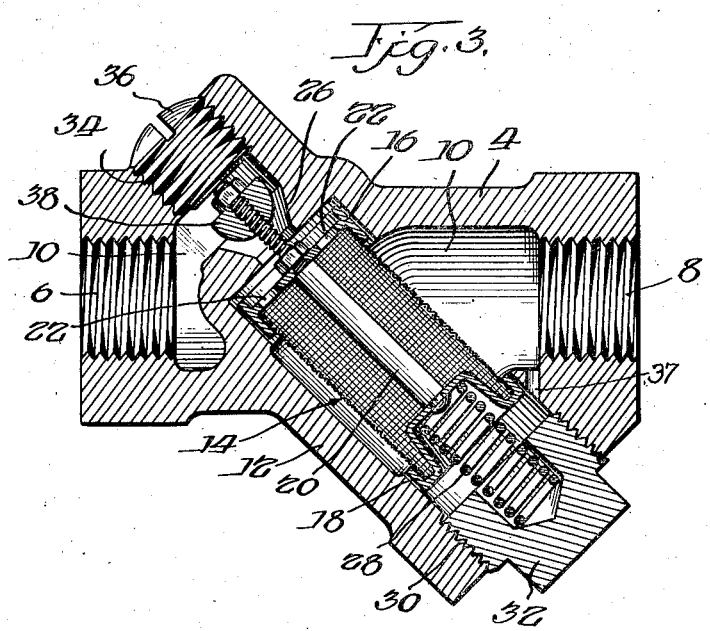
Inventor:
Ernest W. Davis Patented July 23, 1946

2,404,621

UNITED STATES PATENT OFFICE 2,404,621

GREASE STRAINER

Ernest W. Davis, River Forest, Ill., assignor to Stewart-Warner Corporation, Chicago, Ill., a corporation of Virginia Application March 31, 1943, Serial No. 481,221

4 Claims. (Cl. 210—166)

My invention relates to strainers, and more particularly to strainers for separating particles of foreign matter from grease discharged into a high pressure grease line, leading to a plurality of metering devices in a centralized lubricating system adapted to proportion the flow of grease to a plurality of bearings. The prior art discloses many such centralized lubricating systems, for which the strainer of this invention is well adapted.

The necessity for such a strainer is obvious when it is considered that practically all commercial lubricating greases contain particles of lint, scale, grit, fibres, and other extraneous substances, the adverse influence of which may prevent continued successful operation of the aforesaid metering devices. Unlike oil, grease does not permit such impurities to settle by the action of gravity, and as the methods of handling grease are generally less conducive to cleanliness than the methods ordinarily used in dispensing oil, the necessity of installing a strainer in a grease line is quite obvious.

The strainers heretofore used for this purpose comprise a hollow body member containing a wire screen. The body member is often supplied with a removable plug to facilitate convenient removal of the screen when cleaning is necessary. Such strainers are quite satisfactory if they are cleaned before they become clogged with impurities, but in actual practice they are usually neglected. Then when the screen becomes clogged with impurities, the high grease pressure, which may be thousands of pounds per square inch, bursts the screen and allows the accumulated mass of impurities to travel along with the flowing grease to the metering devices, which then become inoperative.

The principal object of this invention is to prevent this objectionable bursting of the screen. This object is accomplished by incorporating a valve in the body of the strainer, which valve is in series with the screen, and by providing means, operative upon partial clogging of the strainer, for closing the valve.

Referring to the drawing:

Figure 1 is an end elevation of the strainer of this invention;

Figure 2 is a sectional side elevation of the same, the section being taken on the line 2, 2, in Figure 1; and Figure 3 is a similar section of a modified form of the strainer shown in Figure 2.

The body member 4 is preferably constructed of air furnace iron, and is provided with an inlet 6, and an outlet 8, with a grease passageway 10, extending from the inlet 6, to the outlet 8. The cylindrical portion 12 is bored at each end to receive a loosely fitting screening element 14, having end pieces 16 and 18, held in position by the connecting rod 20 which serves to hold the cylindrical screening member from collapsing longitudinally. The openings 22, 22 in the end piece 16, permit the passage of grease to the interior of the screening element 14.

The passageway 10 includes a port disposed between the inlet and the outlet and controlled by a spherical check valve 24. The spherical valve 24 is normally held off the valve seat 26 by the end thrust of the connecting rod 20, which is urged in a direction towards the valve 24 by means of the compression spring 28. The screening element 14, and spring 28 are assembled in the body member 4 through the threaded opening 30, which is then closed by the removable closure plug 32. The valve 24 is assembled in the body member 4 through the threaded opening 34 which is then sealed by the removable closure plug 36.

The operation of this strainer is as follows: Grease flowing through the inlet 6 passes around the valve 24, through the openings 22, 22, into the screening element 14, through the interstices of the screening element 14 and out through the outlet 8. Particles of foreign substances in the grease are separated from the grease as it passes through the screening element 14, so that grease discharged through the outlet 8 is relatively clean.

After long continued service the screening element 14 may become clogged with the aforesaid particles, whereupon the differential grease pressure across the screening element 14 causes the entire screening element 14 to move downwardly and towards the right, thereby compressing the spring 28, and thereby permitting the valve 24 to close against the valve seat 26, so as to prevent further passage of grease through the screening element 14. Since grease is a relatively viscous fluid it will tend to carry the valve 24 toward its seat 26 even though the strainer body be inverted with respect to the position in which it is shown in Figs. 1 and 2.

The degree of clogging of the screening element 14 which will cause the valve 24 to close, will, of course, depend upon a number of factors, but, in ultimate analysis, the valve 24 will close when the differential pressure on the opposite sides of the end piece 18 is sufficient to compress the spring 28 to the extent necessary to remove the end of the rod 20 as an obstruction to the seating of the valve.

In practical use of the invention the spring 28 will be made sufficiently strong to hold the valve 24 open until the screening element 14 is substantially clogged, that is, when so many of its interstices are plugged with foreign matter that the lubricating apparatus in which the strainer is incorporated has its grease flow rate noticeably reduced due to the increased resistance to grease flow through the strainer. It will be noted that the portion of the bore through the cylindrical portion 12 is in free communication with the outlet opening 8 through a hole 37.

When this strainer is used in a hand operated greasing system, the inability of the operator to force grease through the system notifies him that the strainer is clogged and needs cleaning.

In the embodiment illustrated in Figure 3, a semi-spherical valve 38 is screwed on the connecting rod 20. The operation of this strainer is the same as that of the strainer illustrated in Figure 2, except that the valve 38 is closed by the connecting rod 20, instead of being closed by movement of the grease.

Without further elaboration, the foregoing will so fully explain my invention that others may, by applying knowledge current at the time of application, readily adapt the same for use under various conditions of service.

I claim:

1. In a strainer device, the combination of a body member having inlet and outlet openings with a passage connecting them for flow of fluid from said outlet to said inlet, said passage including a port, a valve seat around said port, a check valve movable in the direction of flow to engage said seat and close the port, a screening element interposed in the passage between said check valve and the outlet and slidable toward and from said port, spring means urging the screening element toward the port, and means extending from said screening element into engagement with the valve and operative to hold the valve open until the screen becomes so clogged that the pressure of fluid entering at the inlet is sufficient to move the screening element away from the port in opposition to said spring means.

2. In a strainer device, the combination of a body member having a flow passage for fluid extending through it, with inlet and outlet openings respectively at opposite ends of said passage and in substantially axial alignment, a screening element having a pervious cylindrical wall and disposed with its axis at an angle to the common axis of said inlet and outlet, one end of said screening element being open to receive fluid from the inlet end of the passage and said fluid being discharged through said pervious wall of the screening element into the passage and toward its outlet, guide means in said body member in which the screening element is mounted for limited movement in the direction of its axis, a check valve in the passage and a seat therefor disposed adjacent the open end of the screening element, said valve being adapted to control the flow of fluid from the inlet toward said screening element and seating in the direction of said flow, an end wall on the other end of said screening element, means extending rigidly from said screening element into engagement with said valve and serving to hold the valve open at one limit of movement of said screening element, and spring means urging said element toward said limit.

3. In a strainer device, the combination of a body member having inlet and outlet openings adapted for connection with conduit means, said body member having a bore extending at an angle to the axis of said outlet with one side of said bore open to said outlet and with a port at one end of the bore opening to the inlet, a screening element having a pervious cylindrical wall disposed in said bore, the bore providing guide means for limited movement of the screening element in the direction of its axis, one end of said screening element being open to receive fluid from the inlet through said port, said fluid being discharged to the outlet through said pervious wall of the screening element, a valve seat at said port and a valve cooperating therewith to control the flow of fluid from said inlet toward said outlet, said valve seating in the direction of flow toward the open end of the screening element, an end wall on the other end of said screening element, means extending rigidly from said end wall into engagement with said valve and serving to hold the valve open at one limit of movement of said screening element, spring means urging said element toward said limit, and a plug closing one end of said bore and removable to permit removal of the screening element.

4. In a strainer device, the combination of a body member having threaded inlet and outlet openings in substantially axial alignment and having a bore extending at an angle to the common axis of said inlet and outlet, said bore having one side open to the outlet and having a port at one end opening to the inlet, a screening element including a pervious cylindrical wall disposed in said bore and guided for limited movement therein in the direction of its axis, a valve seat at said port and a valve cooperating therewith to control flow of fluid from said inlet toward said outlet, said valve seating in the direction of flow, the end of said screening element toward the port being open to receive fluid from the inlet and said fluid being discharged through said pervious wall of the screening element to the outlet, means extending rigidly from said screening element into engagement with the valve and serving to hold the valve open at one limit of movement of said screening element, a threaded plug closing one end of the bore, a spring reacting between said plug and the screening element urging said element toward said limit of its movement and normally holding the valve open, the removable threaded plug being dimensioned to permit removal of the spring and screening element from the bore.

ERNEST W. DAVIS.